(12) United States Patent
Wittenberg

(10) Patent No.: US 10,255,780 B1
(45) Date of Patent: Apr. 9, 2019

(54) SYSTEM AND METHOD FOR DETECTING AND MAPPING PROGRESSION OF A FIRE EVENT

(71) Applicant: David Wittenberg, Prescott, AZ (US)

(72) Inventor: David Wittenberg, Prescott, AZ (US)

( * ) Notice: Subject to any disclaimer, the term of this patent is extended or adjusted under 35 U.S.C. 154(b) by 0 days.

(21) Appl. No.: 15/991,354

(22) Filed: May 29, 2018

(51) Int. Cl.
*H04W 4/33* (2018.01)
*G01S 19/33* (2010.01)
*G06T 17/05* (2011.01)
*G08B 17/10* (2006.01)

(52) U.S. Cl.
CPC .............. *G08B 17/10* (2013.01); *G01S 19/33* (2013.01); *G06T 17/05* (2013.01); *H04W 4/33* (2018.02)

(58) Field of Classification Search
CPC .......... G08B 17/10; H04W 4/33; G01S 19/33; G06T 17/05
USPC ........................................................ 340/521
See application file for complete search history.

(56) References Cited

U.S. PATENT DOCUMENTS

| | | | |
|---|---|---|---|
| 4,521,645 A | 6/1985 | Carroll | |
| 6,000,505 A | 12/1999 | Allen | |
| 7,561,037 B1 | 7/2009 | Monroe | |
| 8,610,557 B2 | 12/2013 | McSheffrey, Sr. et al. | |
| 9,332,099 B2 | 5/2016 | Puskarich | |
| 9,852,592 B2 | 12/2017 | McSheffrey | |
| 2013/0343202 A1* | 12/2013 | Huseth | H04W 52/0206 370/244 |
| 2014/0005987 A1 | 1/2014 | Maniyath | |
| 2015/0338315 A1* | 11/2015 | Manahan | G01M 99/008 702/183 |
| 2017/0278371 A1* | 9/2017 | Abe | G08B 17/00 |
| 2017/0343966 A1* | 11/2017 | Schadow | G05B 11/06 |

* cited by examiner

*Primary Examiner* — Jack K Wang
(74) *Attorney, Agent, or Firm* — Dale J. Ream

(57) ABSTRACT

A system and method for mapping progression of a fire event within a structure distributing fire event detectors throughout the structure, detecting an ambient air condition indicative of a fire event using the fire event detectors, sounding an alarm in a respective fire event detector if an ambient air condition proximate a respective fire event detector detects a fire event, determining a geographical position of each of the plurality of fire event detectors associated with the structure, determining a clock time indicative of a respective fire sensor detecting a fire event, an emergency response module remote from the plurality of fire event detectors receiving a notification from a respective fire event detector that an ambient air condition indicative of a fire event condition has been detected at a specific time and specific position, and mapping to a display the specific time and the specific detector and position of the notification.

9 Claims, 7 Drawing Sheets

SYSTEM AND METHOD FOR DETECTING AND MAPPING PROGRESSION OF A FIRE EVENT

BACKGROUND OF THE INVENTION

This invention relates generally to fire detection systems and, more particularly, a system and method for first detecting a fire event occurring and progressing in a structure and then recording and later graphically mapping the fire event progression for later use by the property owner, fire professionals, attorneys in litigation, insurers, construction workers, and the like.

In modern times, structures such as a residential home, an office building, a factory, school, or the like may include fire detectors positioned in almost every room, hallway, and stair well. If a fire occurs, there is a great desire that first responders, such as police and fire personnel, be able to identify exactly where the fire is currently burning, the layout and occupancy of the structure, and in which direction the fire may be progressing.

Various devices and systems have been proposed in the art for detecting a smoke or fire event and then transmitting alert message to police, fire, or other predetermined entities. Although presumably effective for their intended purposes, there is still a need for both detecting a fire event, tracking its progression both in real time and being recorded for later mapping and use by many entities and applications.

Therefore, it would desirable to have a system and method for first detecting a fire event is occurring and progressing in a structure and then recording and later graphically mapping the fire event progression for later use by the property owner, fire professionals, attorneys in litigation, insurers, construction workers, and the like.

SUMMARY OF THE INVENTION

A system and method for mapping progression of a fire event within a structure having a plurality of fire detection positions according to the present invention includes distributing a plurality of fire event detectors throughout the structure, each fire event detector including a primary housing having a plurality of walls that define an interior area, detecting an ambient air condition indicative of a fire event using a plurality of fire event detectors, sounding an alarm in a respective fire event detector if an ambient air condition proximate a respective fire event detector detects a fire event, determining a geographical position of each of the plurality of fire event detectors associated with the structure, determining a clock time indicative of a respective fire sensor detecting a fire event, an emergency response module remote from the plurality of fire event detectors receiving a notification from a respective fire event detector that an ambient air condition indicative of a fire event condition has been detected at a specific time and specific position, and mapping to a display the specific time and the specific position of the notification.

Therefore, a general object of this invention is to provide a system and method for first detecting a fire event occurring and progressing in a structure and then recording and later graphically mapping the fire event progression for later use.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
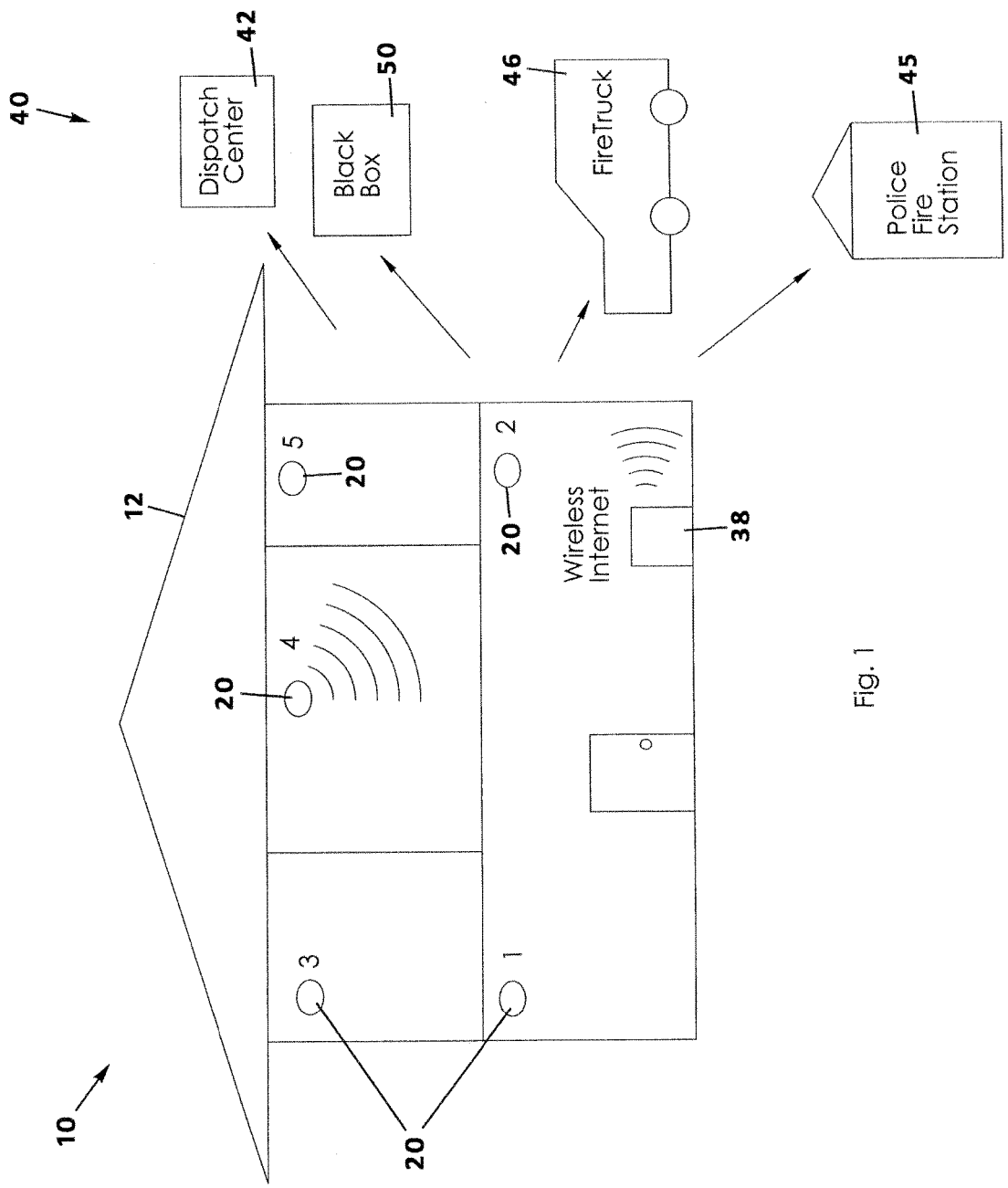
FIG. 1 is a plan view of a system and method for mapping a progression of a fire event.
Figure 2:
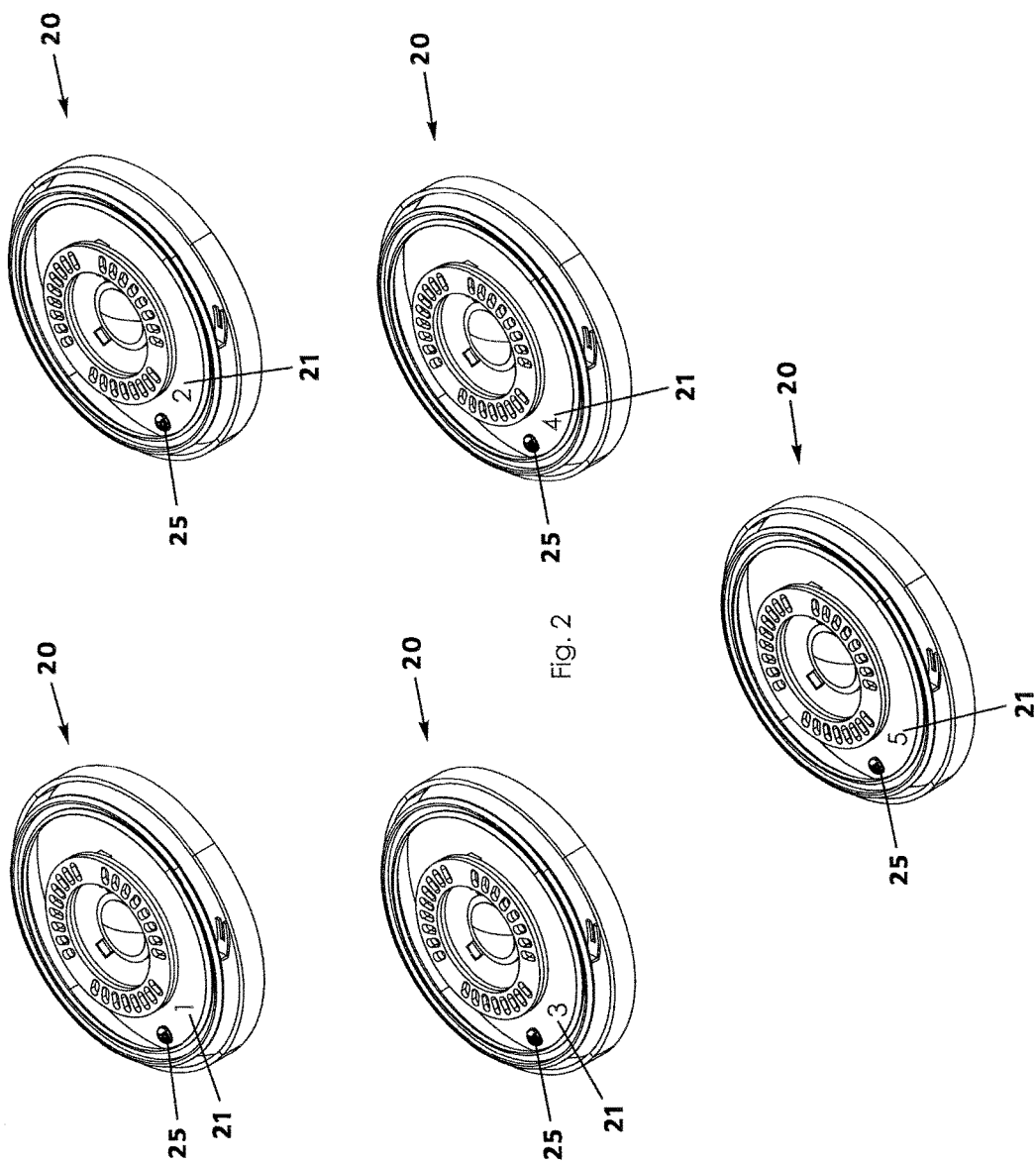
FIG. 2 is a perspective view of a plurality of fire event detectors according to the present invention.
Figure 3:
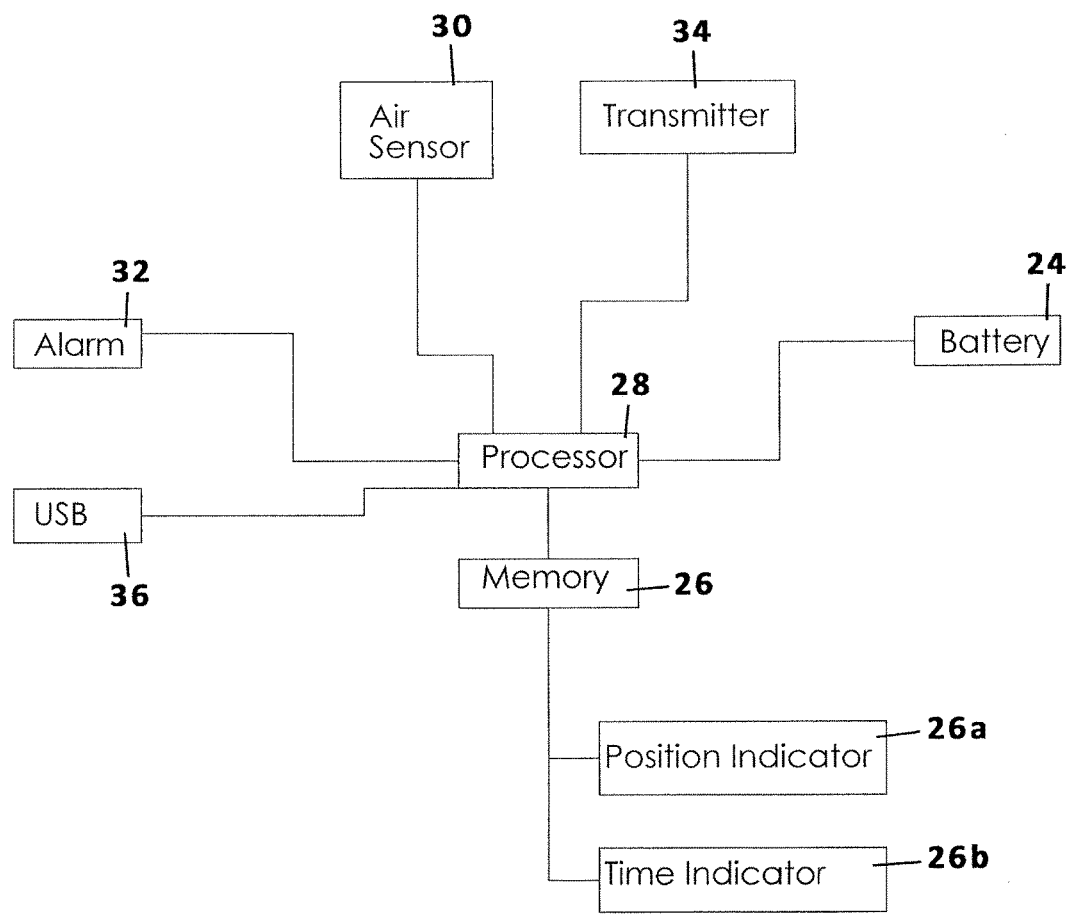
FIG. 3 is a block diagram of the electronic components as in FIG. 2.

A system and method for mapping progression of a fire event within a structure having a plurality of fire detection positions according to a preferred embodiment of the present invention will now be described in detail with reference to FIGS. 1 to 8 of the accompanying drawings. The system 10 includes a plurality of fire event detectors 20 distributed throughout a structure 12, each fire event detector 20 having an alarm 32 and being associated with a position indicator 26a and a time indicator 26b. This data is transmitted to an emergency response module 40 positioned remotely from the fire event detectors 20 and operable to map the structure 12, the position of each fire event detector 20, and the clock time successive sensors have indicated a fire event.

The structure 12 referred to in the present description may be a residential or commercial building, i.e. a home, an office building, a factory, or the like. The structure 12 may include multiple rooms or zones which may be referred to as a plurality of fire detection areas. The system 10 includes a plurality of fire event detectors 20 which are configured for installation throughout the structure 12, i.e. at each respective fire detection area or zone. The geographical position of each fire event detector 20 and of each fire detection area is a known set of geographic coordinates or other systematic method of position identification. For example, each respective fire event detector 20 may include a global position satellite ("GPS") module 22 or circuit operable to identify its own geographic coordinates.

Each fire event detector 20 may include at least one continuous wall or preferably a plurality of walls that, collectively define an open interior area in which other components are mounted or positioned. Each fire event detector 20 may include indicia 21 such as a numeral identifying and distinguishing it from other fire event detectors 20. The indicia may aid a user in coordinating a geographic location within the structure 12 to be mounted. Further, each fire event detector 20 may include a battery 24 positioned in the interior area, the battery 24 being operable as a power source to other components as well as to power an LED 25 indicating it is activated. Each fire event detector 20 may include electronic components positioned in the interior area thereof, such as a nonvolatile memory 26 that is configured to store data and programming instructions and a processor 28 in data communication with the memory 26 and a capable of executing the programming instructions or electrically connected circuitry.

Each fire event sensor 30 also includes a fire event sensor 30 that is in communication both with the ambient air surrounding the detector housing and also in data communication with the processor 28. The fire event sensor 30 may be an air sensor or specifically configured and to detect smoke particles, a level of carbon monoxide, a heat level or the like that is operable to detect an air condition indicative of a fire event. The processor 28 is operable to receive data from the fire event sensor 30 and to execute respective programming to confirm a fire event is occurring or is likely to occur.

In addition, each fire event detector 20 may include an alarm 32 electrically connected to the processor 28 and operable to emit a piercingly loud sound when actuated. For instance, when the processor 28, in communication with the fire event sensor 30, detects an air condition indicative of a fire event, e.g. smoke, heat, temperature, carbon monoxide, or the like, the processor 28 may energize the alarm to emit an audible indication that a fire is or will soon be occurring at the respective location of the alarming detector. In some embodiments, the first detector may energize only its alarm and then energize all of the detectors to sound an alarm, such as via electrical wiring or through remote signals.

Each fire event detector 20 may be connected electrically to a control panel or an emergency alert module. Similarly, each fire event detector 20 may include a transmitter 34 operable to send an alert signal to emergency personnel remotely, such as the police, fire, or third parties. The alert signal may include sending a SMS, text, or cellular signal. Predetermined numbers may be stored in the memory 26 of each fire event detector 20. It is understood that each respective fire event detector 20 may only transmit within a local network (e.g. a home or office network) to a local server 38 which is configured with a transmitter, telephonic assembly SMS circuitry, or equivalent electronics to further transmit the signal indicative of a fire event (FIG. 1).

In another aspect, the position and time of each fire event detector 20 that detects a fire event may be determined, recorded, and used to generate a visual mapping of the totality of a fire event and used subsequently by first responders, property owners, insurance companies, and the like for education, structural design, fire prevention, litigation, and insurance claim purposes. More particularly, a position indicator 26a is stored in a data structure (i.e. a memory location) in the memory 26 when a fire event is detected. For instance, a respective fire event detector 20 may have an input such as a keypad or USB port 36 that enables a user to input a code indicative of the fire detection area at which the respective fire event detector is installed. In an embodiment, the code may be the geographical coordinates of the respective fire event detector. In this regard, the fire event detector 20 may include a global position satellite (GPS) module 22 that is operable to identify its own global position. Then, the processor 28 is operable to record this GPS data in the position indicator 26a which is stored in memory 26. When a fire event is detected, the position indicator data may be transmitted as described above —including the position data so that emergency personnel and the like are made aware of exactly where the fire event is occurring.

Similarly, a time indicator 26b is stored in a data structure (i.e. a memory location) in the memory 26 when a fire event is detected. The time indicator is numeric data of the exact clock time when the fire detection sensor 30 detected a fire event condition and the processor 28 was notified. The respective fire event detector may include appropriate circuitry similar to a cell phone that always has an exact time or may include a connection to a specific website for this purpose. In an embodiment, this time stamp may be obtained electronically from the GPS module 22 at the same time as position indicator data is received. Accordingly, when a fire event is detected, the position indicator 26a may be transmitted as described above —including the time indicator data so that emergency personnel and the like are made aware of exactly where the fire event is occurring. It is understood that the notification signal that may be transmitted from a respective fire event detector and that this signal includes both the position indicator 26a and time indicator 26b.

In another aspect, the system described above includes an emergency response module 40 remote from the plurality of fire event detectors 20 and, most likely, remote from the structure 12 itself. More particularly, the emergency response module 40 may be a dispatch center 42, a fire truck 44, a police of fire station 45, an ambulance, a first responder, a remote auxiliary storage device 50 or the like. For instance, the fire event alert signal, including the position and time data may be included in a signal transmitted to first responders or the like so as to inform first responders of the information they need to respond most effectively to the fire event when they arrive onsite. It is understood that each emergency response module 40 may include a software application, e.g. a fire truck application 46 operable to process incoming data to best determine how best to respond to real time events.

Again, the emergency response module may be an auxiliary storage device 50 remote from the fire event detectors 20. The auxiliary storage device 50 includes a memory configured to store the fire event, position, and time data every time a fire event detector 20 sends a signal regarding a fire event. It is understood, therefore, that the auxiliary storage device 50 will potentially receive dozens or even hundreds of notifications regarding an ongoing fire event and may be accessible potentially long after the fire event has concluded.

Figure 8:
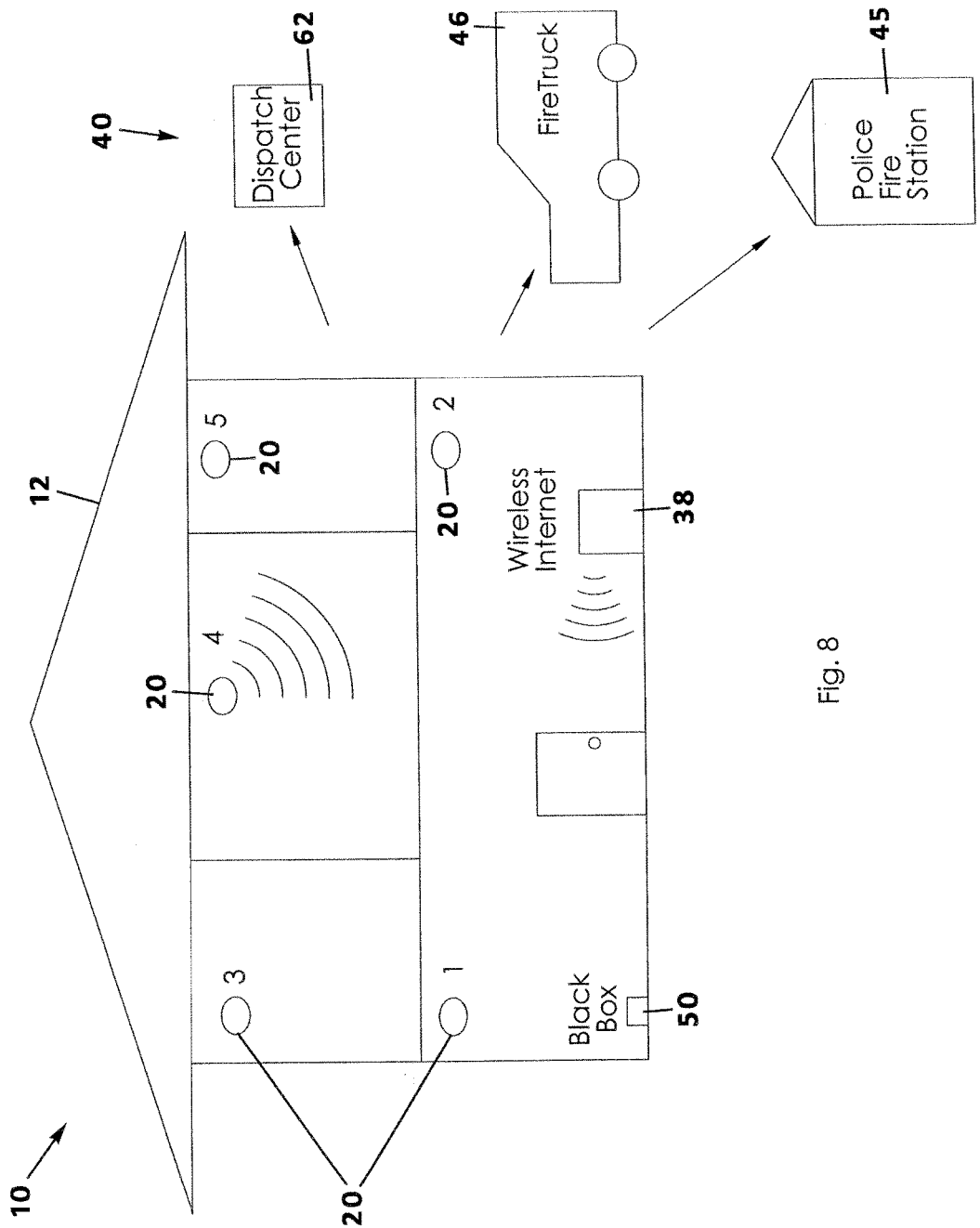
FIG. 8 is a plan view of a variation of a system and method for mapping a progression of a fire event.

The auxiliary storage device 50 may have a housing that is constructed of a material that is fire resistant or even fire retardant so that the memory device situated therein is protected from damage or destruction by the fire event itself. In this instance, the auxiliary storage device 50 may be situated within the structure itself, e.g. in a computer room, utility room, or any similar office space (FIG. 8). After the fire event is over and even if every fire event detector 20 has been destroyed, the auxiliary storage device 50 will remain unburned and the memory therein may be accessed and the data reconstructing the fire event may be accessed and analyzed. The construction that is resistant to destruction causes the auxiliary storage device as a "black box." In one embodiment, the auxiliary storage device 50 may situated remotely of the structure itself, such as in another building within a corporate campus, or even situated at a police station, private third party monitoring facility, or the like.

Figure 4:
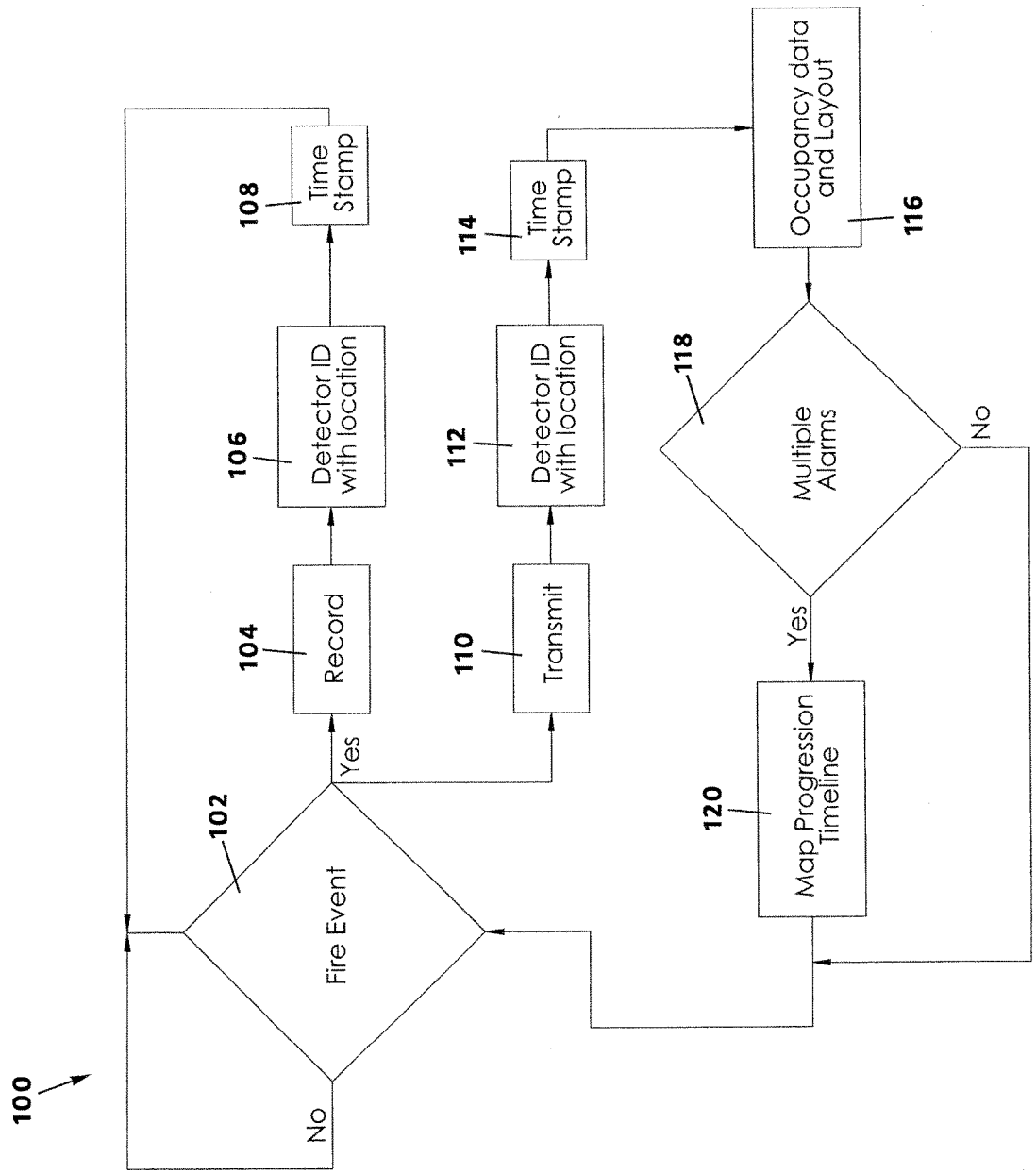
FIG. 4 is flowchart illustrating the logic of the method for detecting and mapping a progression of a fire event.

A process 100 for detecting a fire event, recording data associated with the detection, and transmitting that data, say, to the emergency auxiliary storage module for later mapping, is shown in FIG. 4. Specifically, process 100 begins at step 102 where respective sensors 30 of the plurality of fire event detectors 20 determine if a fire event is detected and, if so, the process proceeds to steps 104, 106, and 108. At step 104, data indicating a fire event is recorded, including position and time data as described above. This data may be recorded in the memory(ies) 26 of respective fire event detectors 20 and any directly connected memory such as that of a connected control panel. Simultaneously, the process 100 proceeds to steps 110, 112, and 114 where the fire event data is transmitted such as by wireless signal transmission to the emergency response module 40 which may include remote first responders and the auxiliary storage device 50. The process 100 then proceeds to step 116 where the layout and occupancy data of the structure 112 being monitored by also be transmitted to the emergency response module 40 (for later mapping). At step 118, it is determined if multiple fire event detectors 20 have reported a fire event (this determination may be made by the processor of the auxiliary storage device) and if so, the process 100 transfers control at step 120 to the process 66 (described later) for mapping a progression timeline. Otherwise, control is passed back to step 102 to again monitor for another fire event detector 20 to activate.

Figure 5:
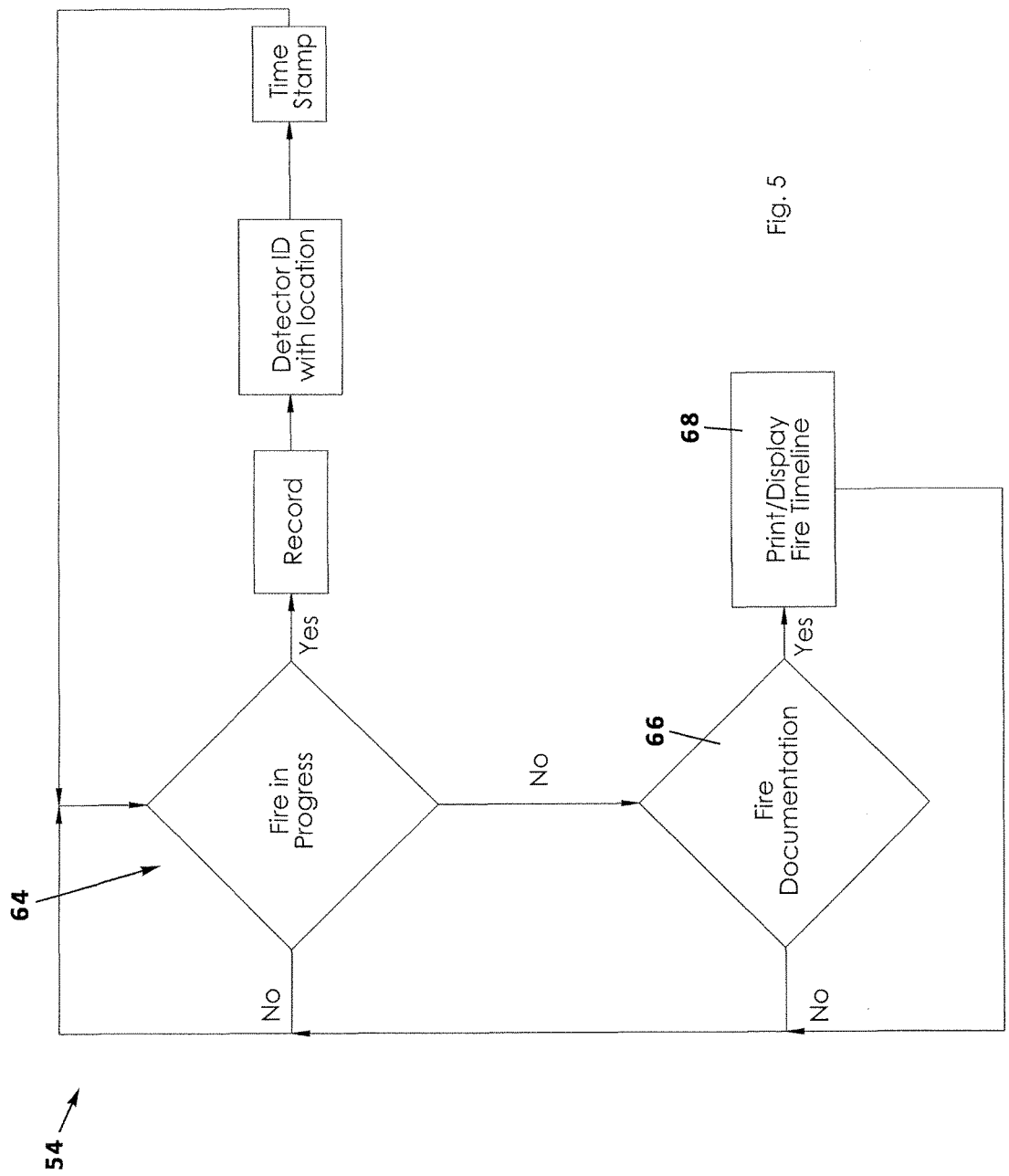
FIG. 5 is a flowchart illustrating the logic of the process of recording data associated with a fire event and then of mapping and printing documentation of the fire event.
Figure 6:
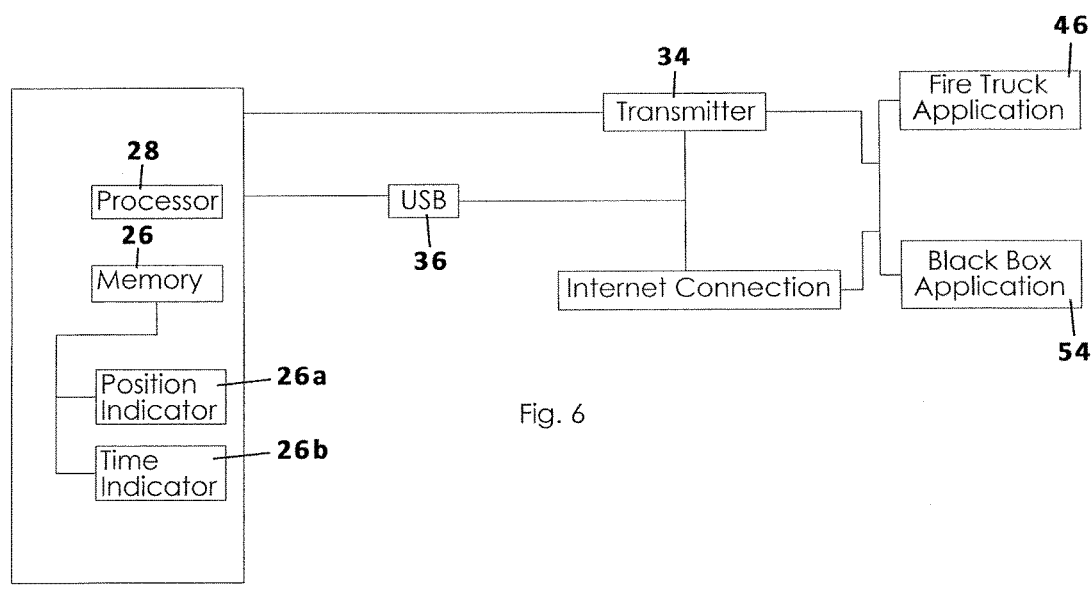
FIG. 6 is a block diagram of the electronic components of a fire event detector according to the present invention.
Figure 7:
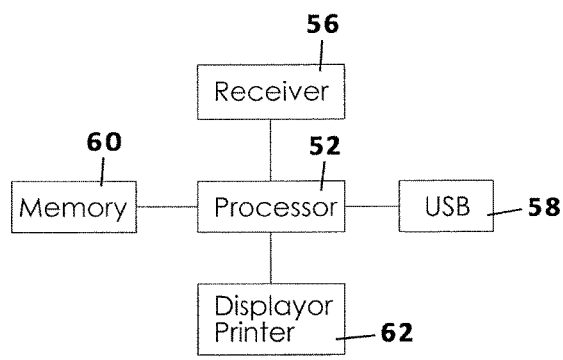
FIG. 7 is a block diagram of an electronic device on which a "black box" software application is installed.

The system for mapping progression of a fire event may further include software application that operates on a computing device such as on a computer, on a smart phone or other electronic device. A process 64 representative of the programming steps described below is illustrated in FIG. 5. The software application includes programming in data communication with and operable by a processor 52 or control circuitry of the computing device on which is running, the programming instructions being embodied in what is referred to a "black box" application 54. Preferably, the software application includes a receiver 56 operable to receive data signal transmissions on demand or automatically from respective fire event detector whenever the respective fire event detector detects a fire event and including associated position and time data. Accordingly, a fire event timeline is generated and stored throughout the occurrence of the fire event (FIG. 5). When the fire event has concluded, i.e. the fire has been extinguished and even if the fire event detectors have been destroyed, the fire event timeline is preserved in the memory 60 of the auxiliary storage device.

The black box application 54 may include a user interface that enables a user to indicate a desire to have written and graphical documentation (step 66) of the past fire event, such as to identify where the fire started and how it progressed relative to the fire event areas of the structure. The position and time data may also be mapped onto a diagram of the structure so as to indicate not only the geographic progression of the fire, but also the exact timing of the fire and progression. All of this data may be mapped graphically for display on a display screen (step 68) or transmitted to predetermined recipient either via the internet, wireless signals, SMS messages, USB 58 hardware to a flash drive, or the like. The software application may be in data communication with an attached or remote printing device 50 and so that the generated map be selectively output to a display or printer 62 and studies or filed in a report or the like (step 68).

It is understood that the system described above may be understood and described as a method for mapping progression of a fire event detectors 20 through a structure 12, the method including the steps of distributing a plurality of fire event detectors 20 throughout a structure. The method includes the steps of the fire event detectors 20 detecting predetermined air conditions indicative of a fire event and then sounding a respective alarm or, upon acquisition or calculation of a respective geographic position and time of detection, delivers this data to a remote emergency response module 40. Finally, the method may include generating a graphical map showing the layout of the structure, the positions of the plurality of fire event detectors 20, and the progression of the fire event with respect to the position and time of said progression, as further described above.

It is understood that while certain forms of this invention have been illustrated and described, it is not limited thereto except insofar as such limitations are included in the following claims and allowable functional equivalents thereof.

The invention claimed is:

1. A system for detecting and mapping progression of a fire event within a structure having a plurality of fire detection positions, said system comprising:
   a plurality of fire event detectors distributed throughout the structure, each fire event detector including a primary housing having a plurality of walls that define an interior area;
   wherein each fire event detector comprises:
      a power source positioned in said interior area;
      a memory that is non-volatile configured to store programming and data structures;
      a processor situated in said interior area and in data communication with said memory and electrically connected to said power source, said processor being operable to execute said programming;
      a fire event sensor in electrical communication with said power source and operable to detect an ambient air condition indicative of a fire event;
      an alarm electrically connected to said power source and positioned in said interior area;
      a position indicator saved in a respective data structure of said memory that is associated with a respective fire event detector and indicative of the respective fire detection position where said respective fire event detector is installed in the structure;
      programming in said memory that, when executed by said processor, causes said processor to determine if said fire event sensor has detected the fire event and, if so, to energize said alarm;
   a time indicator saved in a respective data structure of said memory that is indicative of a date and time stamp when said fire event sensor associated with said respective fire event detector indicated a fire event;
   wherein said time indicator is a time stamp generated by a global position satellite ("GPS") in data communication with said processor and said plurality of fire event detectors;
   wherein said position indicator is generated by said GPS in data communication with said processor and said plurality of fire event sensors;
   wherein said notification includes said position indicator and said time indicator;
   an emergency response module remote from said plurality of fire event detectors that is operative to receive a notification from respective fire sensors that detect an ambient air condition indicative of a fire event;
   wherein:
      said emergency response module is an auxiliary storage device ("black box") having an auxiliary memory that includes auxiliary programming and auxiliary data structures;
      said auxiliary storage device is one of fireproof or fire retardant;
      said auxiliary storage device is positioned proximate said plurality of fire event detectors inside the structure.

2. The system as in claim 1, wherein said time indicator includes a time stamp generated by a cellular telephone in communication with said processor.

3. The system as in claim 1, wherein said emergency response module is one of a police station, a fire station, a fire truck, an ambulance, or an emergency first responder.

4. The system as in claim 1, wherein
said auxiliary storage device is positioned remote from the structure.

5. The system as in claim 1, further comprising:
a software application in data communication with said emergency response module that is operable to map respective position indicators and respective time indicators associated with respective fire sensors associated with said plurality of fire event detectors;
wherein said software application is operable to generate a graphical map indicative of the structure and said position indicators of each of said plurality of fire sensors;
wherein said software application is operable to display said time indicators of each of said plurality of fire sensors according to a time each of said plurality of fire sensors determined an air condition is indicative of a fire event.

6. A method for detecting and mapping progression of a fire event within a structure having a plurality of fire detection positions, said method comprising:
distributing a plurality of fire event detectors throughout the structure, each fire event detector including a primary housing having a plurality of walls that define an interior area;
detecting, using said plurality of fire event detectors, an ambient air condition indicative of a fire event;
sounding an alarm in a respective fire event detector if an ambient air condition proximate said respective fire event detector is indicative of a fire event;
determining a geographical position of each of said plurality of fire event detectors associated with the structure and generating a position indicator associated with said determined geographical position;
determining a time indicator that includes a clock time indicative of a respective fire sensor detecting a fire event, said clock time including a time stamp generated by a global position satellite; ("GPS") in data communication with said plurality of fire event detectors;
wherein said geographical position is determined by said GPS;
generating a graphical map of a layout of the structure and of respective position indicators and respective time indicators associated with respective fire sensors associated with said plurality of fire event detectors;
wherein said graphical map includes a representation of a clock time associated with each of said plurality of fire sensors according to a time each of said plurality of fire sensors determined an air condition to be indicative of a fire event;
an emergency response module remote from said plurality of fire event detectors receiving a notification from a respective fire event detector that an ambient air condition indicative of a fire event condition has been detected at a specific time and specific position;
transmitting said graphical map to said emergency response module;
mapping said specific time and said specific position of said notification;
wherein:
said emergency response module is a fire truck operable to receive said transmitted graphic map and to display said layout of the structure and respective position indicators and respective time indicators associated with respective fire sensors associated with said plurality of fire event detectors;
an auxiliary storage device ("black box") having an auxiliary memory that includes auxiliary programming and auxiliary data structures;
said auxiliary storage device is one of fireproof or fire retardant;
said auxiliary storage device is positioned inside the structure.

7. The method as in claim 6, wherein said time indicator includes a time stamp generated by a cellular telephone in data communication with said plurality of fire event detectors.

8. The method as in claim 6, wherein said notification includes said position indicator and said time indicator.

9. The method as in claim 6, wherein:
said auxiliary storage device is positioned remote from the structure.

* * * * *